Patented Oct. 3, 1950

2,524,729

UNITED STATES PATENT OFFICE 2,524,729

2-AMINO-5-BENZYL-1,3,4-THIADIAZOLE AND ACID SALTS THEREOF

Lucas P. Kyrides, Ferdinand B. Zienty, and George W. Steahly, St. Louis, Mo., assignors to Monsanto Chemical Company, St. Louis, Mo., a corporation of Delaware No Drawing. Application March 12, 1945, Serial No. 582,412

2 Claims. (Cl. 260—302)

This invention relates to therapeutic agents possessing analgesic action and more particularly to a novel analgesic agent and to a process for its preparation.

The present invention is based on discovery that the novel compound, 2-amino-5-benzyl-1,3,4-thiadiazole and its acid salts, such as the hydrochloride, possess marked analgesic action. This compound has the structure

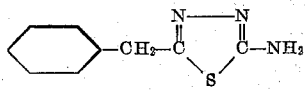

The analgesic agent of the present invention may be prepared by any desired method. A novel process for preparing the compound is illustrated in the following example:

EXAMPLE I

2-amino-5-benzyl-1,3,4-thiadiazole

A mixture of 25 grams (0.27 mole) of thiosemicarbazide and 42.5 grams (0.275 mole) of phenylacetyl chloride was prepared and agitated for 2 hours at a temperature below 100° C. After several hours of additional agitation, the mixture became solid. At this point the condensation was substantially complete. The solid was dissolved in approximately 300 cc. of warm 50% alcohol. The resulting solution was cooled and rendered alkaline with 20% caustic soda solution. The mixture was filtered and the solid material was washed with 250 cc. of water and dried at 90° C. Weight, 25.9 grams (49.5%). Melting point, 191–195° C. When recrystallized from ethyl alcohol the melting point was 200–202° C.

Acid salt derivatives of the 2-amino-5-benzyl-1,3,4-thiadiazoles, such as the hydrochloride, sulfate, benzoate and acetate, may also be employed as thereapeutic agents. The acid salt derivatives may be prepared by reacting in equimolecular proportions 2-amino-5-benzyl-1,3,4-thiadiazole with the appropriate acid in aqueous or organic solvent solution, according to the procedure known in the art for the preparation of the acid salt derivatives of basic organic nitrogen compounds.

The novel compound of the present invention, 2-amino-5-benzyl-1,3,4-thiadiazole, is also useful as an intermediate in the preparation of other therapeutic agents. For example, the compound may be condensed with N-acetylsulfanilyl chloride and the sulfanilamide derivative thus obtained may be hydrolyzed to remove the acetyl residue, forming thereby 2-sulfanilamido-5-benzyl-1,3,4-thiadiazole, a bacteriostatic agent.

While the compositions of the present invention have been described and illustrated in the foregoing specification and examples, it is to be observed that the present invention is not to be construed as being limited in respect to any particular substances, proportions, conditions or combinations except as defined in the claims.

We claim:
1. 2 - amino - 5 - benzyl-1,3,4-thiadiazole, prepared for use as an analgesic and as an intermediate in the preparation of other therapeutic agents.
2. Acid salt derivatives of the compound defined in claim 1.

LUCAS P. KYRIDES.
FERDINAND B. ZIENTY.
GEORGE W. STEAHLY.

REFERENCES CITED

The following references are of record in the file of this patent:

UNITED STATES PATENTS

| Number | Name | Date |
|---|---|---|
| 2,358,031 | Roblin et al. | Sept. 12, 1944 |

OTHER REFERENCES

Chemical Abstract—vol. 36—70094—1942.
Beilstein, 4th Edition—vol. 27—pp. 629 and 647.